US012688656B2

(12) United States Patent
Dasmacci

(10) Patent No.: US 12,688,656 B2
(45) Date of Patent: Jul. 21, 2026

(54) PHYSICAL NAVIGATION THROUGH VIRTUAL COURSE WITHIN VIRTUAL ENVIRONMENT

(71) Applicant: Frank F. Dasmacci, Rocklin, CA (US)

(72) Inventor: Frank F. Dasmacci, Rocklin, CA (US)

( * ) Notice: Subject to any disclaimer, the term of this patent is extended or adjusted under 35 U.S.C. 154(b) by 152 days.

(21) Appl. No.: 18/397,750

(22) Filed: Dec. 27, 2023

(65) Prior Publication Data

US 2025/0218127 A1     Jul. 3, 2025

(51) Int. Cl.
　　*G06T 19/00*　　(2011.01)
　　*G06F 3/01*　　(2006.01)
　　*G06T 19/20*　　(2011.01)

(52) U.S. Cl.
　　CPC ............ *G06T 19/003* (2013.01); *G06F 3/011* (2013.01); *G06T 19/006* (2013.01); *G06T 19/20* (2013.01)

(58) Field of Classification Search
None
See application file for complete search history.

(56) References Cited

U.S. PATENT DOCUMENTS

| | | | | |
|---|---|---|---|---|
| 12,112,440 | B2 * | 10/2024 | Zohni | ................... G02B 27/017 |
| 2017/0294135 | A1 * | 10/2017 | Lechner | ................... G09B 9/32 |
| 2018/0096455 | A1 * | 4/2018 | Taylor | ..................... G06T 17/05 |
| 2019/0352005 | A1 * | 11/2019 | Shomin | ................... A63H 27/12 |
| 2021/0047037 | A1 * | 2/2021 | Karatayev | ............. A63F 13/211 |
| 2021/0049925 | A1 * | 2/2021 | Robinson | ................ G06F 3/013 |
| 2021/0295732 | A1 * | 9/2021 | Rosolio | .................... G09B 9/30 |

OTHER PUBLICATIONS

Kim, Dong-Hyun, Yong-Guk Go, and Soo-Mi Choi. "An aerial mixed-reality environment for first-person-view drone flying." Applied Sciences 10.16 (2020): 5436. (Year: 2020).*

* cited by examiner

*Primary Examiner* — Ryan M Gray
(74) *Attorney, Agent, or Firm* — Klintworth & Rozenblat LLP

(57) ABSTRACT

The present invention embodies a novel navigational system that enhances the experience of pilots and passengers of physical aircraft (and other physical vehicles) traveling through actual three-dimensional space. In addition to facilitating the creation of a virtual course through which physical aircraft will travel while flying through actual three-dimensional space, the present invention also facilitates the creation of a virtual environment (modeling remote, inaccessible and imaginary locations) into which the virtual course is integrated, and manages the synchronization of the physical aircraft to the virtual course within the virtual environment during actual physical flight. In this manner, the present invention enhances the experience of pilots and passengers by illustrating dynamic views of the physical aircraft traveling along the virtual course within the virtual environment. The present invention enables competitive, sightseeing, educational, entertaining and various other types of experiences.

4 Claims, 2 Drawing Sheets

100

PHYSICAL NAVIGATION THROUGH VIRTUAL COURSE WITHIN VIRTUAL ENVIRONMENT

BACKGROUND

Field of Art

The present invention relates generally to navigating physical vehicles through a virtual course, and more particularly to enhancements of the experience of physical vehicle pilots and passengers enabled by a virtual environment into which the virtual course is integrated, as well as by superimposed transparencies of prior navigations, immersive views of navigations and various other experiential enhancements.

Description of Related Art

Since the 1960s, virtualization has enhanced the experience of computer users in a myriad of ways. Hardware virtualization (e.g., via simulators and emulators) involves the creation of software facsimiles of computing platforms, storage devices, network resources and other actual hardware devices. Virtualization eliminates the need for such actual hardware devices, while providing users with essentially the same "experience"—i.e., a simulated or "virtual" experience.

In addition to virtualizing actual hardware devices, the field of virtualization has expanded to include "virtual reality" and "virtual worlds" that involve the creation of software facsimiles of actual real-life experiences, as well as partially or wholly imaginary experiences. Applications are essentially infinite, ranging from video games to virtual meetings to virtual education, virtual surgery and beyond.

Recently emerging fields include "augmented reality" (in which one's view of and interaction with the real world is "augmented" with metadata and other virtual objects) and "mixed reality" (in which a virtual world is essentially integrated into the real world). In addition to or in lieu of typical computer displays, VR headsets are often employed to provide users with a more immersive experience.

While virtualization in all of its many forms provides users with an enhanced experience, there remain certain actual physical experiences which, even if they can be enhanced via virtualization, cannot be completely replaced or simulated without losing the essence of such experiences. One such category of actual physical experiences involves the navigation of physical vehicles—in particular, airplanes. As many pilots (and passengers) will attest, the physical feeling of "flying" through the air is a somewhat unique experience that is difficult to replicate, despite the existence of "flight simulator" software and devices, which have their own utility.

While much of the following discussion focuses on physical aircraft, it will become apparent that many of the concepts discussed herein are applicable to other physical vehicles, including automobiles, motorcycles, watercraft, etc. The virtualization concepts discussed herein are of significance in the manner in which they enhance (rather than replicate or replace) the actual experience of navigating, as well as being a passenger in, a physical vehicle.

Apart from the utility of commercial aircraft for personal travel and the transport of goods, as well as military aircraft, there remains a sizable demand for recreational private aviation. It is estimated that the number of private pilots in the world is in the many hundreds of thousands (over 200,000 in the United States alone). In addition to flying friends and family for personal travel, many private pilots simply enjoy the recreational value of the flying experience.

Yet, flying private aircraft is a relatively expensive recreational hobby. Unlike many other hobbies, enhancing the flying experience through competition, sightseeing and other forms of recreation is often prohibitively expensive for private pilots. For example, "air racing" is an activity typically reserved for the very wealthy. It involves a fixed course designated by physical pylons. One of the more famous series of races was the "Red Bull Air Race World Championships" which started in 2003 and folded in 2019 due to a lack of corporate sponsorship. While other air racing events are still planned, the limitations imposed by a physical course, and the need for participants to travel to a scheduled event, represent significant barriers that effectively prevent the vast majority of private pilots from participating in such events.

In addition to competitive racing, other recreational activities, such as sightseeing, are also prohibitively expensive for most private pilots. The cost of fuel alone is exorbitant, not to mention the time and expense involved in traveling long distances to desirable points of interest. There is thus a need to overcome the obstacles inherent in physical race courses and physical sightseeing locations that prevent the participation of the bulk of the private flying community in these and other recreational pursuits.

Virtualization technology offers a partial solution to this problem. For example, by virtualizing a race course or sightseeing location, one can avoid the cost, time and other barriers imposed by having to travel to an actual physical location, construct a physical course and conduct a race at a specific time and location.

Others have attempted to employ virtualization technology in the context of physical flight. For example, U.S. Pat. App. Pub. No. 2010/0096491, published Apr. 22, 2010 ("Rocket-Powered Entertainment Vehicle"), discloses the concept of "rocket racing" along a virtual course, as a safer and more flexible alternative to physical pylons. This patent application describes competitions in which pilots of rocket-powered vehicles race against one another simultaneously in real time at the same physical location, but along a virtual course that includes virtual pylons to enhance the experience.

Yet, this application neither discloses nor suggests means of overcoming the key obstacles discussed above. Few private pilots can afford to purchase and operate rocket-powered vehicles. Moreover, the disclosed forms of competition still require that the pilots travel to a single location for a scheduled real-time (or near real-time) racing event—itself an expensive proposition. This application includes no description or suggestion of allowing non-simultaneous competition, much less at different physical locations.

While it mentions applications beyond racing rocket-powered vehicles (e.g., other physical vehicles traveling through three-dimensional ("3D") space, whether on land, in the air, or even underwater), its suggestions are limited to the insertion of virtual objects and other forms of augmented reality to create a virtual course. In short, the obstacles discussed above remain.

Another example of employing virtualization in the context of physical flight can be found in U.S. Pat. App. Pub. No. 2010/0305724, published Dec. 10, 2010 ("Vehicle Competition Implementation System"). This application focuses on "air racing" (more akin to the Red Bull competition discussed above), rather than racing rocket-powered vehicles. Yet it still focuses on the integration of physical flight with virtual objects and a virtual course to provide a safer competitive experience. In other words, it also utilizes the virtual course as a means of "augmented reality" to enhance the experience of physical flight in a safe manner.

Yet, this application also fails to overcome the obstacles discussed above. It neither describes nor suggests a competition in which pilots are competing from different physical locations and/or at different times (e.g., days, weeks or even months apart). As a result, the use of virtualization technology to enhance a pilot's navigational experience of actual flight is limited to augmenting reality by integrating a virtual course with virtual objects.

The focus of both of these applications is limited to this augmented reality experience in which pilots of physical vehicles still must incur significant time and expense, along with other obstacles, to participate in competitions and other forms of recreation. Moreover, the experience of navigating (much less being a passenger within) a physical vehicle is enhanced only by the insertion of virtual objects along a virtual course. While both applications discuss the experience of "spectators" watching these events, neither contemplates the experience of "passengers" who are also experiencing actual physical flight.

Both applications disclose heads-up displays or "HUDs" as a means of enabling pilots to visualize the virtual course superimposed onto actual three-dimensional space. But neither suggests fully immersing the pilot (e.g., with a safety pilot aboard) or passengers into the experience by use of a VR headset-a further suggestion that the "vision" of these prior art applications is limited to an augmented reality experience in which actual physical flight is enhanced only by the insertion of virtual objects along a virtual course.

There thus remains a need to overcome these obstacles and further enhance the experience of navigating (and being a passenger within) a physical vehicle in three-dimensional space by employing virtualization technology to transport pilots and passengers into a "virtual environment" including remote, inaccessible and imaginary locations. In such a virtual environment, the constraints of physical locations are essentially removed. Pilots and passengers can experience "physical flight" (e.g., in proximity of their own local airport) within a virtual world that simulates a myriad of recreational applications, including air racing, combat and other competitions, as well as sightseeing excursions. The possibilities are virtually limitless.

SUMMARY

As noted above, the following description of the present invention is focused on a navigational system for physical flight—in particular on enhancing the experience of actual airplane pilots and passengers. It will become apparent, however, that the concepts discussed below are applicable to other physical vehicles (automobiles, motorcycles, watercraft, etc.) in that they involve enhancing the experience of those navigating, as well as being passengers within, such vehicles.

The present invention addresses the obstacles described above by modeling a virtual environment into which a virtual course is integrated. In the context of the present invention, the location of such a virtual environment can be remote from the pilot's actual location. For example, the virtual environment could be the Las Vegas strip, but could be experienced by pilots and passengers from within proximity of the pilot's local airport in Atlanta, GA, in Venice, Italy or most anywhere in the world.

Similarly, a virtual environment may be modeled upon an actual but essentially inaccessible location, such as the center of the Earth, the Rings of Saturn or even the interior of a human body. Moreover, a virtual environment can even represent a completely imaginary location, such as the Star Wars Death Star or the underwater world of Atlantis, among others.

In various embodiments, the present invention involves the creation of a model of the virtual environment and its component objects, whether extracted from mapped data of an actual location, or generated by employing mathematical coordinate-based representations, such as 2D or 3D modeling techniques, of an imaginary or other "virtual world." In one embodiment, the virtual environment is independent of the virtual course into which it is integrated. In other embodiments, the virtual course is unique to specific components of the virtual environment. For example, a race through Las Vegas casinos could involve a virtual course mapped onto specific casino locations as well as scenery and other objects within particular casinos.

Having created (or enabled third parties to create) a virtual environment into which a virtual course is integrated, the navigational system of the present invention manages the navigation of a physical vehicle through that virtual course. For example, the system obtains input from the participants (pilot, passengers, etc.) regarding the characteristics of the physical vehicle and selected aspects of the desired experience. As the pilot navigates the physical vehicle through the virtual course, the system calculates the transformations (including any handicapping or other relative performance attributes) necessary to synchronize the vehicle's actual and virtual positions.

The system also generates the views seen by the pilot and any passengers, whether on 2D or 3D displays (along with any additional audio, visual or other data and/or metadata). In one embodiment, pilots experience an augmented reality view, showing the virtual course mapped onto the "real world" display from the cockpit.

In other embodiments, pilots (particularly with a safety pilot aboard) and passengers experience a more immersive view (e.g., via VR headsets) of the virtual course integrated into the virtual environment. In still other embodiments, different passengers may select different views along the virtual course (such as additional metadata, or even different perspectives of the same virtual location and component objects). In yet another embodiment, different passengers (as well as the pilot) may even experience entirely different virtual environments and/or virtual courses. Automated (non-human) pilots are employed in other embodiments to enhance the experience of passengers without requiring the need for a human pilot.

Many of the details regarding the experience that the pilot (and any passengers) encounter will depend upon the nature of the scenario(s) defined for the selected virtual course and virtual environment. For example, as will be discussed in greater detail below, the experience may involve a competition-based scenario. In one embodiment, pilots compete against one other in real time from different physical locations, relying upon real-time communications to present each pilot with the others' virtual positions along the virtual course.

In other embodiments, pilots compete on the basis of time trials, in which each pilot navigates their airplane (regardless of physical location) through a selected virtual course within a virtual environment. Pilots may compete for fastest time, and may gain and lose points based upon relative position, split times, ability to avoid obstacles, capture "virtual rewards" and various other aspects of the virtual course. In other embodiments, some of these aspects may be specific to the virtual environment itself.

In one embodiment, the experience of a time trial scenario is enhanced with "transparencies" showing the relative position of prior navigations through the same virtual course. In this embodiment, pilots can "compete" against their own prior races or those of others (e.g., the current "fastest time" leader for a particular virtual course). It should be emphasized that the transparency of a prior pilot's relative position is quite distinct when encountered in real time as the current pilot is navigating the virtual course (as opposed to the experience of a spectator viewing the transparency).

Pilots and any passengers will experience not only the "feeling of flight" through the virtual course, but from within the virtual environment as well-including scenery, navigational barriers and other restrictions, in addition to visual, audio and other metadata. In other embodiments, a combat scenario enhances (or replaces) a typical race scenario. Actual and virtual pilots may be added to provide targets for the pilot as well as "shoot down" the pilot, each of which provides opportunities for gaining and losing points.

In other embodiments, also discussed below, sightseeing scenarios offer opportunities for enhancing the recreational experience of actual flight. Virtual environments include various "points of interest" and the virtual course provides different experiences of the same virtual environment. For example, one virtual course involves a one-hour tour including 10 key points of interest. Another virtual course involves a three-hour tour covering more points of interest with more in-depth metadata (text, audio, images, animation, video, etc.) at each "stop," while yet another virtual course allows pilots to "chart their own course" within the confines of the virtual environment and designated points of interest.

Following is a detailed description of the accompanying Figures, along with descriptions of a few examples of the many specific scenarios enabled by the present invention. It will be apparent to those skilled in the art that variations of potential scenarios are essentially unlimited within the context of the present invention. In all such scenarios, the experience of navigating (and/or being a passenger within) a physical vehicle is enhanced through the integration of a virtual course into a virtual environment.

DETAILED DESCRIPTION

Figure 1:
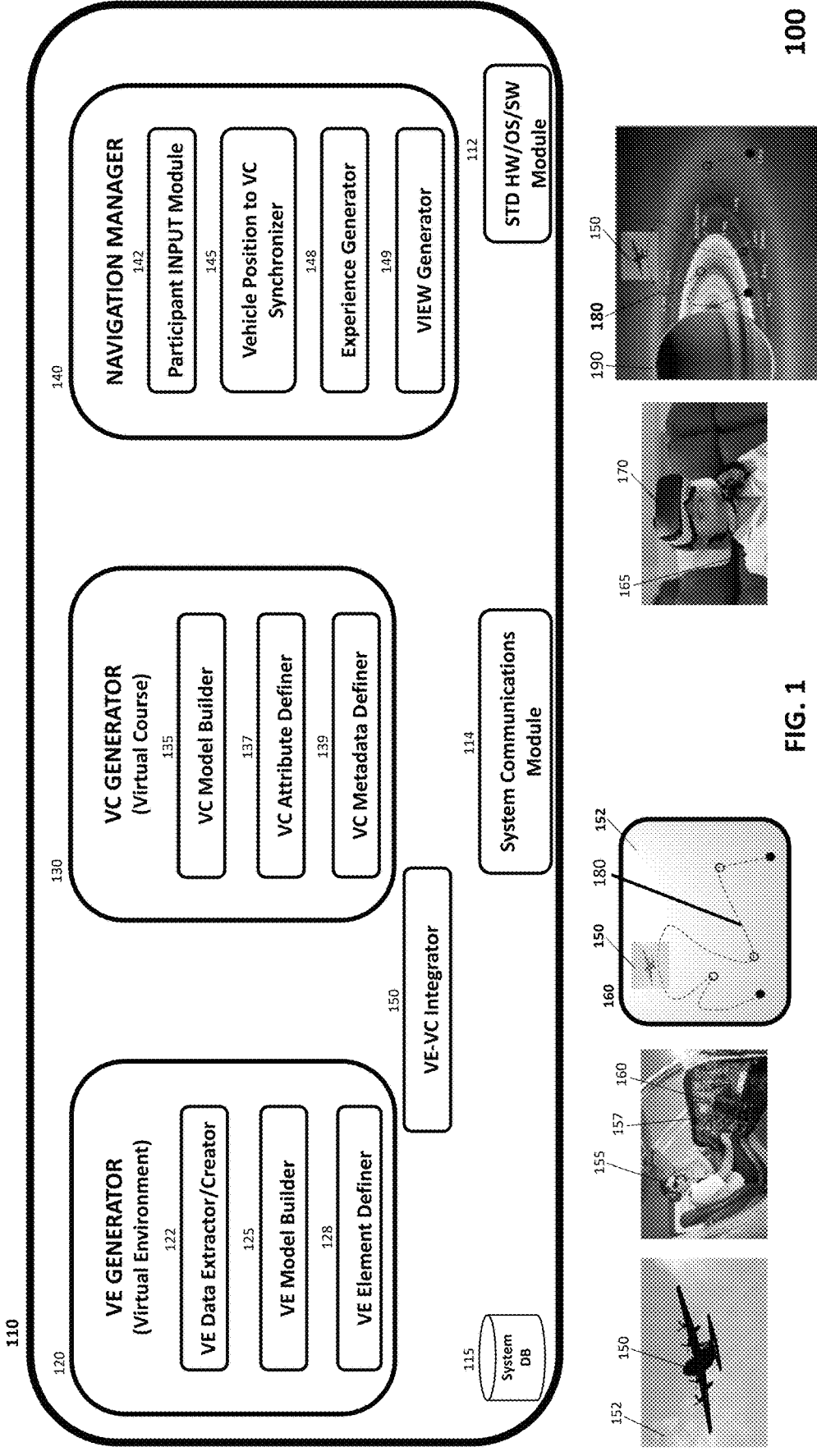
FIG. 1 is a system diagram illustrating one embodiment of key components of a navigational system of the present invention.

Turning to FIG. 1, block diagram 100 illustrates one embodiment of key components of a navigational system of the present invention. Server 110 illustrates key functional modules that may be implemented in hardware, software and combinations thereof, and can be divided into sub-modules or combined together across one or more physical servers (or desktops, laptops, tablets or other computing devices) in accordance with design and engineering tradeoffs by those skilled in the art without departing from the spirit of the present invention.

Software components of server 110 are embodied in standard HW/OS/SW (hardware/operating system/software) module 112, in particular in physical non-transitory computer-accessible storage media (i.e., memory) from which software is invoked for execution by one or more CPUs or other physical processing units. Server 110 may be implemented on one or more computer servers accessible over the Internet by one or more users in real time, as well as on one or more standalone computing platforms. Users employ server 110 for the development of virtual environments and virtual courses integrated therein, and for management of the navigation of physical vehicles through such virtual courses within associated virtual environments.

In addition to key components of server 110 discussed below, system 100 includes one or more physical vehicles 150, each of which in this embodiment is illustrated as an airplane that travels through actual three-dimensional space 152. In other embodiments, different types of physical vehicles are employed, such as cars, motorcycles, watercraft, etc. In still other embodiments, multiple types of physical vehicles are employed within the same virtual course.

Airplane 150 includes a human pilot 155, a cockpit 157 and a display 160 (e.g., iPad or other tablet) on which the virtual course 180 (and, in some embodiments, the virtual environment 190) is displayed. In one embodiment, tablet 160 includes standard sensors (GPS, accelerometer, gyroscope, etc.) that are employed by system 100 to monitor the position, orientation and maneuvers (turns, climbs, descents, etc.) of airplane 150. In other embodiments, such sensors are included elsewhere onboard airplane 150.

System 100 further includes virtual course 180, which is illustrated on tablet 160 mapped to actual three-dimensional space 152. Tablet 160 also displays the current position of airplane 150 within virtual course 180. In this manner, pilot 150 can track the current position of airplane 150 not only within actual three-dimensional space 152, but within the virtual course 180 to which it is mapped.

In one embodiment, system 100 further includes one or more passengers 165 within airplane 150, each of which experiences actual physical flight. For a more immersive experience, each passenger 165 wears a VR headset 170, which provides a display of virtual course 180 within virtual environment 190, but without a view of actual three-dimensional space 152 (which is optionally included in other embodiments).

In addition to providing an immersive display, VR headset 170 enables that display to translate its orientation in accordance with the head movements of passenger 165 (along with other interactive controls). In this manner, each passenger 165 experiences a unique immersive view of virtual course 180 within virtual environment 190 (e.g., due to their respective head movements), along with the experience of actual flight by virtue of being a passenger within airplane 150 as pilot 155 navigates airplane 150 along virtual course 180.

For example, in one embodiment illustrated in FIG. 1, virtual environment 190 represents the Rings of Saturn, while virtual course 180 follows a path through different individual rings and other points of interest. In this embodiment, VR headset 170 enables each passenger 165 to view the current location of airplane 150 as pilot 155 navigates virtual course 180. As noted above, each passenger 165 is provided a unique experience based on individual head movements, as well as other selected interactive metadata options (e.g., additional audio, video and other metadata associated with a current point of interest within virtual environment 190).

In another embodiment, each passenger 165 experiences a selected one of multiple different virtual environments 190, despite the fact that pilot 155 navigates a single virtual course 180. In this embodiment, virtual course 180 is mapped to two or more different virtual environments 190. For example, a relatively simple straight-line virtual course including 7 points of interest could be embedded into 2 different virtual environments, one of which is modeled on 7 casinos along the Las Vegas strip, while the other is modeled on 7 "Wonders of the World" (ancient or new) by aggregating each of the 7 destinations along the virtual course within a single hybrid "real/imaginary" virtual environment.

Returning to server 110, System Communications Module 114 provides a mechanism for server 110 to communicate with other servers (e.g., real-time communication among pilots 155 of different airplanes 150), as well as with control towers and other ground-based resources. In one embodiment, such communications include Internet-based communications. System database (DB) 115 represents one or more databases employed by other modules of server 110, for example, for storing data relating to the development of virtual environment 190 and/or virtual course 180, as well as during the real-time navigation of each airplane 150.

Key modules of server 110 include VE Generator 120 (for building virtual environment 190), VC Generator 130 (for building virtual course 180), VE-VC Integrator 150 (for integrating virtual course 180 into one or more virtual environments 190) and Navigation Manager 140 (for implementing the navigation of each airplane 150 along a virtual course 180 within one or more virtual environments 190). In one embodiment, system 100 includes software implementing Navigation Manager 140, along with VE Generator 120, VC Generator 130 and VE-VC Integrator 150 "builder software" enabling users of system 100 (e.g., third-party companies, or even individual pilots 155) to design and integrate custom virtual courses 180 into custom virtual environments 190 for use by pilots 155 and their passengers 165.

In one embodiment, VE Generator 120 includes VE Data Extractor/Creator 122 for extracting 2D or 3D data coordinates for the features of a particular virtual environment 190. In the case of an actual virtual environment 190, such as the Grand Canyon, standard data extraction techniques (aerial and satellite imagery, LIDAR data, etc.) are employed to obtain and format desired data. In the case of inaccessible or imaginary virtual environments 190, such data are generated manually or in an automated fashion by extrapolating from existing available sources of information (or, alternatively, by building a model "from scratch" (outside of VE Data Extractor/Creator 122).

VE Generator 120 also includes VE Model Builder 125 for building a model from which different perspectives of virtual environment 190 may be generated. This model may optionally include data obtained using VE Data Extractor/Creator 122 or, particularly for wholly imaginary virtual environments 190, may rely solely on the model to generate virtual environment 190.

Finally, VE Generator 120 includes VE Element Definer 128 to supplement virtual environment 190 with metadata and other additional elements beyond the geographic features themselves. For example, a model of a virtual environment 190 of the Solar System may include geographic features of each planet, as well as relative distances among the planets and perspective views from any coordinate location But, elements generated by VE Element Definer 128 might include gravitational effects of each planet on an airplane 150 (e.g., based on its relative virtual distance from each planet), as well as metadata relating to each planet. In the context of a "sightseeing tour" through the Solar System, pilots 155 and passengers 165 might be shown audio, video, text and other metadata relating to a planet within proximity of airplane 150. In the context of a "racing course" through the Solar System, additional objects might be included (e.g., moons, asteroids or other celestial bodies). In other embodiments, elements defined by VE Element Definer 128 include virtually any objects, characteristics, properties or other aspects specific to virtual environment 190.

In one embodiment, VC Generator 130 includes VC Model Builder 135 for building a model from which different perspectives of virtual course 180 may be generated. Unlike the model of virtual environment 190, which is essentially a "virtual world" into which virtual course 180 is integrated, the model of virtual course 180 includes virtual waypoints representing destinations along one or more paths through which airplane 150 will navigate, as well as other static and dynamic virtual objects encountered along the way.

VC Generator 130 further includes VC Attribute Definer 137 for defining the various attributes of the virtual waypoints and other virtual objects. For example, the virtual course 180 illustrated in FIG. 1 includes waypoints representing different Rings of Saturn, as well as pathways among them. In one embodiment, virtual course 180 represents a racecourse in which only one particular ordered path among the various Rings of Saturn is permitted. In another embodiment, virtual course 180 represents a sightseeing tour in which the Rings of Saturn each represent a point of interest which may be visited along any path. In other sightseeing embodiments, a time limits for the tour is imposed and different subsets of the points of interest are selected prior to navigation.

VC Attribute Definer 137 includes further elements and attributes of virtual course 180. For example, in a racecourse scenario, additional static or dynamic objects may result in penalties or rewards. The effect of veering off course may also result in penalties. Various attributes of colliding with virtual course 180 waypoints or other objects may be defined by VC Attribute Definer 137, such as gaining or losing points, changing position along the racecourse, and various other effects.

Moreover, VC Metadata Definer 139 enables designers of virtual course 180 to add metadata (text, audio, images, animation, video, etc.) to a particular waypoint or other position along virtual course 180 (or, in another embodiment, to a position outside of virtual course 180 but within virtual environment 190). For example, upon navigating airplane 150 within proximity of such a position (e.g., a point of interest in a sightseeing tour), pilot 155 (as well as passengers 165) would be presented with such metadata (e.g., additional information relating to the nearby point of interest). In another embodiment, individual passengers 165 selectively invoke the presentation of such metadata (e.g., via a head movement or other gesture).

The designer of virtual course 180 and/or virtual environment 190 utilizes VE-VC Integrator 150 to determine how to integrate virtual course 180 within virtual environment 190. For example, in one embodiment, illustrated in FIG. 1, virtual course 180 may represent points of interest mapped to specific elements or virtual locations within the Rings of Saturn virtual environment 190. In other embodiments, virtual course 180 is simply mapped to a particular coordinate position within virtual environment 190 without defining any relationship to particular points of interest or other elements of virtual environment 190 (i.e., treating it simply as "background scenery"). In such embodiments, a specific virtual course 180 may easily be integrated within multiple different virtual environments 190.

VE-VC Integrator 150 enables designers to employ VE Generator 120 and VC Generator 130 iteratively while designing both virtual course 180 and virtual environment 190 in an integrated fashion. In other embodiments, different designers may independent create virtual course 180 and virtual environment 190, leaving simpler integration choices for another user.

Once one or more designers have created both a virtual course 180 and virtual environment 190, and have integrated them together, Navigation Manager 140 is employed by pilots 155 to navigate their respective airplanes 150 through virtual course 180 as integrated into virtual environment 190. It should be noted that while many scenarios involve a single airplane 150 (e.g., in a racing time trial or a solo sightseeing tour), other scenarios involve multiple airplanes 150 (e.g., even in different physical locations, such as a real-time race between two or more pilots 155, or on a multi-airplane sightseeing tour).

Before takeoff, each pilot 155 employs Participant INPUT Module 142 to obtain relevant details regarding each participant (pilots 155 and passengers 165) within each airplane 150. Other input includes the type and other characteristics of each airplane 150 (e.g., for the purpose of "handicapping" a slower or faster airplane 150 in a time trial, as well as establishing constraints upon the capabilities of each airplane 150, such as its maneuverability, combat capabilities or ability to navigate "legs" of a racecourse or sightseeing tour within certain timing constraints).

In one embodiment, inputs to Participant INPUT Module 142 include selections by pilots 155 and individual passengers 165 regarding the particular virtual course 180 and virtual environment 190, as well as options regarding the type of race, sightseeing tour, time and point-of-interest constraints, individual passenger metadata options and various other options dependent upon the nature of a specific desired experience. For example, individual passengers 165 may elect to employ VR headsets 170, or view a "group" display shared among passengers 165. Moreover, individual passengers 165 may select different metadata options or, in some embodiments, even a different virtual environment 190.

Before the experience begins, Vehicle Position to VC Synchronizer 145 is employed to synchronize the actual physical position of each airplane 150 with a particular virtual position on virtual course 180 within virtual environment 190. Typically, this occurs after takeoff, but before the experience begins at the start of virtual course 180. In some embodiments, the takeoff can be part of the experience, in which case Vehicle Position to VC Synchronizer 145 is employed to synchronize an actual physical position of an airplane 150 on the ground with the virtual position at the start of virtual course 180.

Once the experience begins, Experience Generator 148 is employed to track the physical position of each airplane 150, translate that position into its corresponding virtual position within virtual course 180 (and thus within virtual environment 190) and implement the results of any interactions with boundaries of virtual course 180 and any static or dynamic objects or other elements of virtual course 180 and virtual environment 190.

For example, in one embodiment, Experience Generator 148 determines if airplane 150 crosses any boundaries of virtual course 180, which could result in a point or time penalty, a change to a prior virtual position, or other penalty. Experience Generator 148 also tracks any "collisions" with other static or dynamic virtual objects, potentially resulting in rewards or penalties. Moreover, Experience Generator 148 implements any handicapping (e.g., adjusting virtual position based upon relative capabilities of airplane 150) or other effects of proximate objects (e.g., gravity, combat shots from other actual or virtual aircraft, movements of VR headsets which affect perspective views, etc.).

Having accounted for the effects identified by Experience Generator 148, VIEW Generator 149 determines and generates the views on each relevant tablet display 160 (e.g., for pilot 155) and passenger 165 VR headset (which may differ for each passenger of airplane 150). In one embodiment, Experience Generator 148 and VIEW Generator 149 regenerates updated effects and views periodically (e.g., every $\frac{1}{60}^{th}$ of a second), while in other embodiments, such effects and views are regenerated based upon a combination of elapsed time and conditional changes (e.g., to the state of one or more objects).

Moreover, VIEW Generator 149 integrates into the view various metadata relating to the experience. For example, in one embodiment, such metadata includes elapsed times, as well as "transparencies" of prior navigations (by the same or different pilots 155) at various waypoints along virtual course 180, along with cumulative points incurred during a time trial. In other embodiments, metadata includes additional information relating to points of interest (e.g., selected by one or more passengers 165), such as text descriptions, images, animations or video specific to each particular point of interest.

In one embodiment, Navigation Manager 140 is implemented as a self-contained smartphone or tablet "app" that performs the above-described functionality. In other embodiments, such functionality can be implemented wholly or partially in software running on a laptop or other computer, or even distributed across computer hardware located outside of airplane 150 (e.g., via the Internet using System Communications Module 114). Similarly, other components of Server 110 are also, in other embodiments, implemented wholly or partially in software on a smartphone, tablet, laptop or other computer, or on separate standalone devices (e.g., standalone computer software for generating and integrating virtual courses and virtual environments, coupled with an app for implementing the functionality of Navigation Manager 140 and System Communications Module 114).

Figure 2:
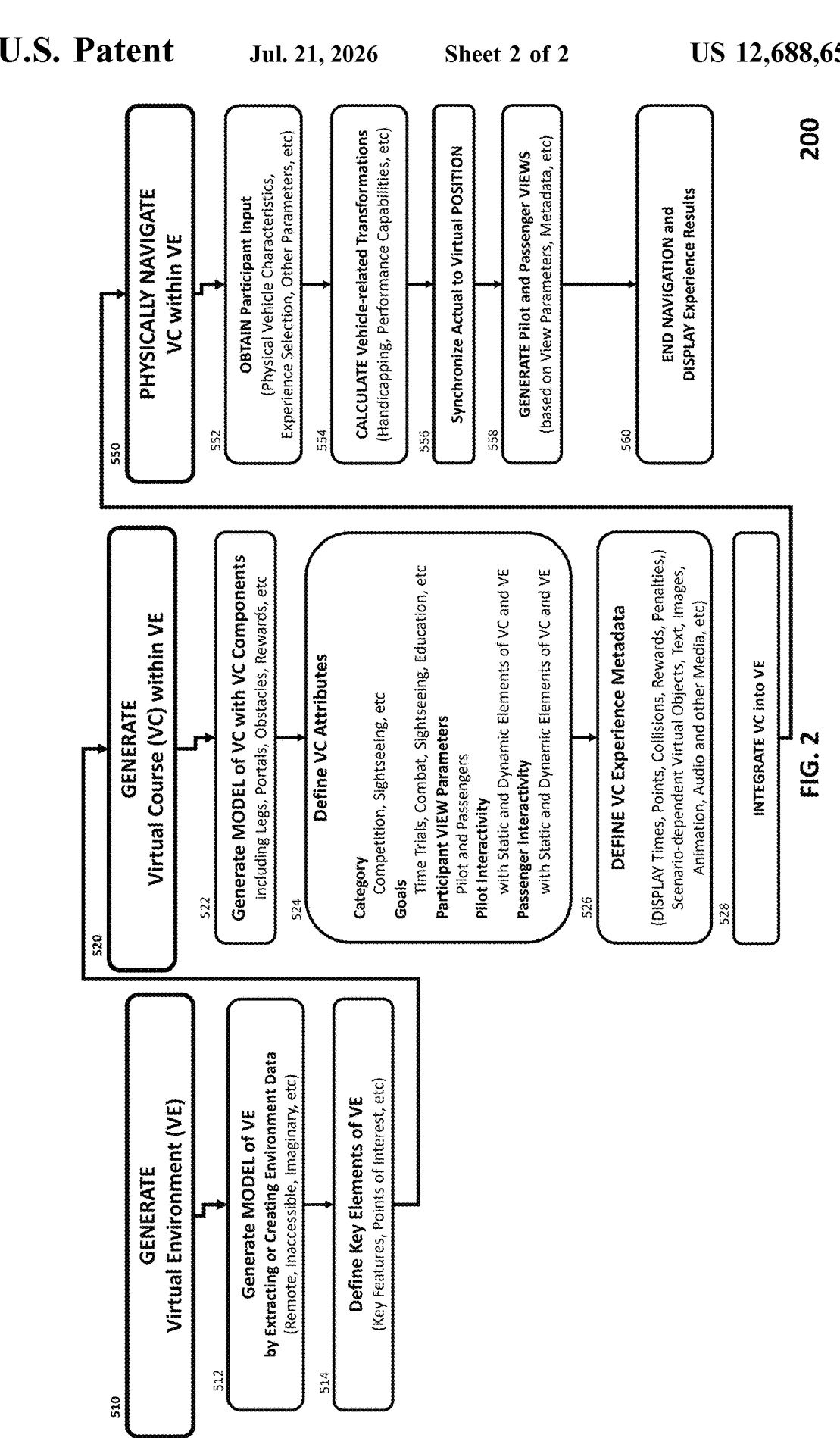
FIG. 2 is a flowchart illustrating one embodiment of key steps of a dynamic process by which the navigational system of the present invention enhances the experience of the pilot (and any passengers) of a physical vehicle by enabling the creation of a virtual environment and a virtual course integrated within that virtual environment, as well as navigation of the physical vehicle through that virtual course.

Turning to FIG. 2, flowchart 200 illustrates one embodiment of key steps of a dynamic process by which a navigational system of the present invention enhances the experience of pilots 155 (and any passengers 165) of a physical vehicle such as airplane 150. In other words, the modules described with respect to FIG. 1 above perform the steps of flowchart 200 by enabling the creation of an integrated virtual course 180 within a virtual environment 190, and implementing the effects of pilots 155 navigating one or more airplanes 150 along that virtual course 180 integrated within that virtual environment 190. It should be noted that the steps of flowchart 200 need not be performed in any particular order. In particular, virtual course 180 and virtual environment 190 may be created in any order, and may be created in parallel to ensure the desired level of integration.

Beginning with step 510, VE Generator 120 enables the creation of virtual environment 190. As discussed above, VE Model Builder 125 generates a model of virtual environment 190 in step 512. If necessary, VE Data Extractor/Creator 122 is employed to extract data (e.g., from existing remote environments, such as the Grand Canyon or the Las Vegas strip, as well as inaccessible environments, such as the inside of the human body) which VE Model Builder uses to generate its model. For completely imaginary environments, step 512 may not require the extraction of any known data.

In step 514, VE Element Definer 128 is employed, as noted above, to supplement virtual environment 190 with metadata and other additional elements beyond the geographic features themselves. Such elements include attributes of existing geographic features, such as gravitational effects of celestial bodies, combat effects of being shot at by other physical or virtual airplanes, supplemental static and dynamic objects (e.g., to generate rewards and penalties), and metadata (text, audio, images, animation, video, etc.) relating to various points of interest.

Beginning with step 520, VC Generator 130 enables the creation of virtual course 180. As discussed above, VC Model Builder 135 generates of model of virtual course 180 in step 522. This model includes virtual waypoints representing destinations along one or more paths through which airplane 150 will navigate, as well as other static and dynamic virtual objects encountered along the way (e.g., to generate penalties and rewards).

VC Attribute Definer 137 performs step 524 to define the various attributes of the virtual waypoints and other virtual objects. For example, in one embodiment, virtual course 180 is defined for one or more particular categories of experiences, such as competition trials, combat, sightseeing, etc. Particular goals may be defined (e.g., fastest time, most points or some combination thereof). Various participant view parameters may also be defined. For example, pilot 155 may have a view on tablet 160 of virtual course 180 superimposed onto actual three-dimensional space, while one or more passengers 165 may have a more immersive view of virtual course 180 integrated into virtual environment 190 displayed on VR headset 170. As noted above, individual passengers 165 may experience different perspective views based upon their head position, as well as other interactive features (e.g., zooming, changing field of view, etc.).

In other embodiments, additional attributes are defined in step 524, including pilot 155 interactivity attributes relating to encounters with various static and dynamic objects (e.g., results of combat shooting and being shot at, colliding with objects to obtain rewards or penalties). Passengers 165 may also have similar interactivity attributes, depending upon the scenario for the desired experience. For example, individual passengers 165 may be able to capture static or dynamic objects (for rewards or penalties) via head movements of their VR headsets 170 or other interactive gestures.

In step 526, VC Metadata Definer 139 is employed to define additional metadata with respect to virtual course 180 as integrated into virtual environment 190. For example, intermediate racing times and points may be displayed at various points along virtual course 180 (e.g., relating to collisions with static and dynamic objects, resulting in rewards and penalties). In other embodiments, metadata includes additional information (text, audio, images, animation, video, etc.) relating to particular points of interest.

In step 528, VE-VC integrator 150 is employed to define how virtual course 180 is integrated into virtual environment 190. As noted above, in one embodiment, virtual course 180 is simply mapped to a particular virtual coordinate origin point of virtual environment 190 (i.e., treating virtual environment 190 as background scenery). In such environments, a specific virtual course 180 may easily be integrated within multiple different virtual environments 190.

In other more integrated embodiments, specific waypoints of virtual course 180 are mapped to specific geographic features or points of interest of virtual environment 190. In such embodiments, designers of virtual course 180 and virtual environment 190 often design individual components of virtual course 180 and virtual environment 190 together in an iterative fashion.

Turning to step 550, Navigation Manager 140 implements the experience of pilots 155 navigating their respective airplanes 150 through virtual course 180 as integrated into virtual environment 190. As noted above, the particular experience will depend upon the desired scenario, such as engaging in a racing time trial, a combat scenario or a sightseeing tour.

Participant INPUT Module 142 is employed in step 552 (typically before takeoff) to obtain relevant details regarding each participant (pilots 155 and passengers 165) within each airplane 150. Other input includes the type and other characteristics of each airplane 150, the type of race or sightseeing tour, time and point-of-interest constraints, individual passenger metadata options and various other options dependent upon the nature of a specific desired experience.

Before the experience begins, Vehicle Position to VC Synchronizer 145 is employed in step 554 to calculate initial virtual positions of each airplane 150 relative to the start of virtual course 180, along with relative transformations relating to handicapping and other performance constraints and enhancements. These transformations are employed during the experience to adjust positions (or time, in other embodiments) of airplane 150 relative to the capabilities of the aircraft or other relative factors.

In step 556, once the experience begins (and pilot 155 navigates airplane 150 along virtual course 180), Experience Generator 148 is employed to track the physical position of each airplane 150, translate that position into its corresponding virtual position within virtual course 180 (and thus within virtual environment 190) and implement the results of any interactions with boundaries of virtual course 180 and any static or dynamic objects or other elements of virtual course 180 and virtual environment 190.

In step 558, VIEW Generator 149 determines and generates the views on each relevant tablet display 160 (e.g., for pilot 155) and passenger 165 VR headset (which may differ for each passenger of airplane 150). In addition to perspective views of airplane 150 within virtual course 180 (as integrated into virtual environment 190), these views include any additional metadata related to the selected experience (such as split times, transparencies of prior pilots in a time trial scenario, cumulative points, and other metadata, such as additional information (text, audio, images, animations and video) relating to a particular point of interest encountered during a sightseeing tour.

Following are sample scenarios illustrating many of the novel aspects of the present invention. It will be apparent to those skilled in the art that many other virtualized scenarios may be generated to enhance the experience of actual physical flight encountered by pilot 155 and passengers 165 without departing from the scope of the present invention.

Scenario #1 Competition—Time Trials

In a first scenario described below, pilots located anywhere in the world (in any owned or rented airplanes 150) compete with one another (at different times and from different locations) by flying "time trials" with respect to a predefined virtual course. In one embodiment, the virtual course is created by one or more third parties (e.g., using VC Generator 130), while in other embodiments it is created by a pilot or multiple pilots in collaboration with one another. In still other embodiments, the virtual course is integrated within a virtual environment, which also may be created (e.g., using VE Generator 120 and VE-VC Integrator 150) by one or more pilots or third parties. In one embodiment, this "course builder" software is made available to pilots and other developers to create virtual courses and/or virtual environments for use by themselves and by others (e.g., for monetary compensation, game credits or other forms of remuneration).

In another embodiment, pilots compete against one another with respect to the same virtual course, but across different virtual environments. For example, one pilot may fly a time trial along a virtual course integrated into the Grand Canyon, while another pilot may (at a different time, and from a different location) fly a competing time trial along the same virtual course, but integrated into the Star Wars Death Star.

In one embodiment, pilots equip their cockpits 157 with a display 160 (e.g., an iPad or other tablet) that also provides sensors (GPS, accelerometer, gyroscope, etc.) to monitor the position, orientation and maneuvers (turns, climbs, descents, etc.) of their airplane 150. In other embodiments, such sensors are included elsewhere onboard airplane 150. Display 160 is mounted to a kneeboard or other readily available mounting system.

In one embodiment, before initiating a time trial, a pilot opens an "app" (smartphone, tablet or otherwise) that acquires the GPS location of airplane 150 and loads an initial menu. The pilot selects the airframe type of airplane 150 and the virtual course and/or virtual environment to be flown. These selections can be made prior to or after commencing flight.

After making these selections and commencing flight, the pilot navigates to a safe area, establishes pitch and roll level flight and initiates the time trial (e.g., via a "START" button on display 160). The app calibrates the pitch and roll attitude of airplane 150 to "0/0" to establish a baseline attitude of airplane 150. The display 160 now illustrates the virtual course at a distance in front of airplane 150, and the pilot navigates toward the "START Gate" of the virtual course.

In other embodiments, the virtual environment is displayed (with the virtual course integrated therein) for viewing on a VR headset 170. If a safety pilot is present (to monitor the attitude and speed of airplane 150, and maintain situational awareness), the pilot wears VR headset 170, which provides a fully immersive view of the virtual course integrated into the virtual environment.

Otherwise, for safety reasons, display 160 only illustrates the virtual course, which optionally is integrated into the view of actual three-dimensional space. In another embodiment, an optional "birdseye" view of the virtual course is displayed to provide spatial orientation, with the position of airplane 150 shown as the flight progresses.

Any passengers, however, may wear a VR headset 170 for a fully immersive experience. In one embodiment, each passenger may select a different virtual environment. While the pilot navigates airplane 150 through the virtual course, individual passengers may experience the same physical flight along that virtual course, but integrated within uniquely individual virtual environments. In other embodiments, passengers may also select different perspective views of the time trial race, as well as various metadata options designed into the integrated virtual environment.

The pilot, after flying through the START Gate, then navigates airplane 150 through the virtual course. It should be noted that there are an infinite number of layouts and designs for a virtual course, including gates, obstacles, rewards and other virtual objects. In one embodiment, each "gate" of the course is designated by two pylons, which pilots must traverse at wings level. Single pylons are depicted by floating boxes illustrating an optimal route through the virtual course (e.g., in between gates).

Once the pilot flies through the START gate, a clock timer begins, and the pilot navigates through the virtual course with the goal of achieving the lowest overall flight time possible. The position of airplane 150 as it progresses through the virtual course is illustrated on display 160, along with the current overall flight time. In one embodiment, split times are also illustrated on display 160 as the flight progresses through each gate.

In yet another embodiment, "handicaps" are employed with respect to the type of airplane 150 being flown. For example, an airplane 150 that is far more (or less) advanced and maneuverable than a "standard baseline" aircraft will have a multiplier applied to increase or decrease its actual current overall flight time. In other embodiments, such handicaps are employed based on a pilot's experience and skill level and various other factors necessary to "normalize" a fair race across different pilots and aircraft.

In another embodiment, the virtual course has a "hard deck" simulating the ground. If the pilot descends below the hard deck, the trial ends and a new START button is displayed along with the message: "Establish level flight and press START when ready." This enables the pilot to start a new time trial without having to navigate to any particular physical starting point.

In one embodiment, pylons are marked with "low" and "high" marks. The pilot must pass each pylon in between the low and high marks, or suffer a 5-second penalty (added to the elapsed flight time). If a pilot strikes a pylon, a 10-second penalty is assessed. In another embodiment, rewards and penalties are assessed in response to collisions with "good" and "bad" virtual objects. For example, colliding with a "good" object ("cookie") results in a reward reducing 5 seconds from the overall flight time, whereas colliding with a "bad" object ("obstacle") results in a penalty adding 5 seconds to the overall flight time. In other embodiments, such rewards and penalties affect a separate point score independent of overall flight time.

In still other embodiments, pilots earn points and/or modifications of overall flight time for the performance of selected required and optional navigational maneuvers (detected automatically by Navigation Manager 140). In another embodiment, rewards and penalties for attempting and successfully completing such navigational maneuvers depend upon the location within the virtual course at which these navigational maneuvers are performed.

Upon completing the time trial, the pilot can upload to Server 110 all metadata resulting from the flight—e.g., overall flight times, split times, navigational positions along the virtual course throughout the time trial, as well as various other related information. Such metadata enables others to review the results of the uploaded time trial, and even to view a "playback" of the time trial.

In one embodiment, a pilot downloads one or more previous time trial flights along a particular virtual course (by the same pilot or others) from Server 110, and uploads them to Navigation Manager 140 in connection with the pilot's upcoming time trial flight. Upon pressing the START button to initiate the time trial, Navigation Manager 140 superimposes onto display 160 a real-time "transparency" of the aircraft position(s) of the prior time trial flights on the virtual course, along with the real-time position of the current pilot.

In this manner, the current pilot experiences a real-time "race" with those who navigated the same virtual course in prior time trials. The current pilot therefore can make real-time navigational decisions as if other aircraft were flying this time trial simultaneously. As noted above, the current pilot encounters a significantly different experience from a "spectator" who is merely watching a video of a transparency of other time trials, but is not actually flying an aircraft and making real-time navigational decisions.

In one embodiment, competitions are held with respect to a particular virtual course, with prizes awarded for lowest overall flight time. In other embodiments, tournaments are held with pilots advancing through multiple rounds of a tournament bracket (semifinals, finals, etc.). Yet, as noted above, pilots need not participate at the same time or date, or from a single physical location. The enhanced experience of competition (traversing the same virtual course) is nevertheless available, coupled with the experience of actual physical flight.

In still other embodiments, while the virtual course is uniform throughout all time trials, different pilots may experience different virtual environments into which that virtual course is integrated. This enables pilots to have different overall experiences (e.g., combining actual flight with the enhancement of different virtual environments) while still navigating the same virtual course.

In other embodiments, racing leagues sanction particular events (e.g., with respect to a specific virtual course and/or virtual environment) that are streamed and/or televised at regular intervals or predetermined dates and times. In one embodiment, races are categorized by aircraft type, number of engines and total horsepower.

Despite pilots participating at different times and from different locations throughout the world, the use of transparencies enables spectators to experience the feel of a "live event"-but without the significant added cost and logistical complexity of holding such events at a single time and location (including expensive event setup, venue insurance and related costs). In one embodiment, spectators, as well as passengers, may in real time switch their view among different competing aircraft. For example, a spectator or a passenger could switch to the perspective view of any of the participating pilots, including the transparencies of other competitors with respect to the selected aircraft.

In other embodiments, multiple different events are "created" simply by mixing and matching prior time trials with respect to a specific virtual course and/or virtual environment. Moreover, in another embodiment, the virtual course may even be integrated into a virtual environment than is different from the one experienced by the actual pilot who navigated that time trial. Just as passengers may experience different virtual environments with respect to a particular virtual course, so too can spectators experience different virtual environments from the one experienced by a particular pilot's time trial.

In another embodiment, competitions involve multiple aircraft navigating a virtual course simultaneously (as opposed to asynchronous time trials). As noted above, System Communications Module 114 is employed in such embodiments to exchange real-time positional information (e.g., over the Internet) to synchronize the positional calculations of Navigational Manager 140 among the real-time participants.

It will become apparent to those skilled in the art that many other variations of this time trial scenario, including use of transparencies and passenger experiences, are possible without departing from the principles of the present invention.

Scenario #2 Competition—Combat

In another variation of a competitive scenario, pilots compete not for "fastest time," but in a combat scenario against other actual or virtual pilots. In one embodiment, pilots compete in actual real-time combat with other pilots—albeit from different physical locations. In another embodiment, a pilot competes again one or more virtual pilots (i.e., computer-generated pilots). In yet another hybrid embodiment, two or more actual pilots are in competition with one another as well as with one or more virtual pilots.

In these various scenarios, one or more pilots select the virtual course as in the prior time trial scenario. Upon selecting a "combat" scenario, each pilot may select whether to experience the virtual course on display 160 or, if a safety pilot is present, to experience a more immersive view of the virtual course integrated into the virtual environment via VR headset 170. Any passengers may also wear a VR headset 170 for a more immersive experience (with similar options for selecting individual virtual environments and metadata options).

In one embodiment, the combat experience includes a choice of representative aircraft type to be displayed in the virtual environment (distinct from the type of the actual physical aircraft) and the era in which the combat mission will be flown—e.g., World War I, World War II, modern warfare, or an entirely fictitious combat scenario on earth, in outer space, etc.

Once the pilot presses the START button to initiate the virtual course, a "radar" map appears with friendly and enemy aircraft depicted in different colors (each of which may, in one embodiment, be pilots of actual physical aircraft or computer-generated virtual aircraft). Each such aircraft is displayed on the radar map with associated type and altitude. In one embodiment, the virtual course for a combat scenario includes various virtual objects representing different locations, but without a prescribed navigational path through the virtual course.

Once an enemy aircraft is in site (i.e., in sufficient proximity), the pilot may engage that enemy aircraft and fire a weapon of choice (e.g., machine guns, guided missiles and other ordinance). The pilot determines a desired strategy. For example, if the enemy aircraft is a bomber, the pilot may elect to go high, approach from the sun and attack from the blind side. If the enemy aircraft is a fighter, the pilot may employ a different strategy. Machine guns and missiles are selected by pressing a virtual button on display 160 or, in another embodiment, via a physical control device mounted next to display 160.

In one embodiment, audio of friendly and enemy radio communications "chatter" enhances the experience. In another embodiment, pilots may also engage virtual enemy ships at sea as well as bomb ground targets or any combination thereof. In still other embodiments, the combat experience can be replicated (with appropriate copyright licenses) from actual motion picture and television combat events (e.g., Star Wars, Top Gun, Star Trek and other films and television shows, as well as entirely imaginary events).

Unlike the focus on "fastest time" to complete a time trial, combat scenarios involve the accumulation of points during a combat mission. For example, points are acquired by evading and shooting down enemy aircraft and other virtual objects, while points are deducted when being shot by such enemy aircraft, crashing into virtual obstacles or other related events designed into the virtual course and/or virtual environment.

As with time trial scenarios, it will become apparent to those skilled in the art that many variations of combat scenarios, including physical and virtual friendly and enemy aircraft and other virtual obstacles, as well as passenger experiences, are possible without departing from the principles of the present invention.

Scenario #3 Sightseeing

Apart from competitive scenarios (time trials, combat, etc.), many other scenarios are possible within the confines of the present invention. One such type of scenario involves sightseeing adventures to remote, inaccessible or imaginary locations (i.e., virtual environments). These scenarios may serve educational, thrill-seeking and/or purely entertainment purposes.

In one embodiment, a virtual course is created (as in other types of scenarios) with a plurality of "points of interest" locations representing destinations to which a pilot of airplane 150 may navigate. In some embodiments, the virtual course dictates the order in which the pilot must navigate, while in other embodiment, the destinations are subject to the desires of the pilot.

While a sightseeing scenario may be limited to pilots of airplane 150 in one embodiment, passengers are the focus of other embodiments. For example, passengers select and book travel experiences online, choosing from different available virtual environments (in some cases with the same integrated virtual course). Such experiences differ in duration and/or number of destinations, as well as in the choice of virtual environment.

In one embodiment, passengers meet at a designated airport and board an aircraft capable of equipping multiple passengers with VR headsets 170 as well as motion generators that vibrate at different frequencies and wavelengths to provide additional sensory input to enhance the experience. Passengers receive an FAA-required safety briefing upon boarding, followed by a summary of the experience.

Passengers may elect various options in one embodiment, including forward and aft views, fully immersive 360-degree views of the virtual environment, choices of particular point-of-interest destinations, and particular types of metadata media (e.g., text, audio, video, etc.), among other options. Once VR headset 170 is activated, the immersive virtual environment includes adventure-specific features (e.g., alien ground handlers, personnel in spacesuits or other apparel specific to the adventure, such as departure from a moon base).

The navigational path among point-of-interest destinations is choreographed seamlessly to allow, for example, natural g-forces from climbs and turns to integrate with the visual and audio input provided via VR headset 170 (e.g., including superimposed propulsion sounds as well as pre-recorded announcements relating to approaching points of interest). In one embodiment, individual passengers may elect among different options for metadata relating to an approaching point of interest. In another embodiment, different passengers experience different points of interest along the same virtual course, including entirely different virtual environments.

In one embodiment, the experience is akin to a "motion theater," with integrated "actors" shown in holographic form to facilitate the narrative of the story of the sightseeing adventure. For example, a passenger on a sightseeing adventure to a remote nature preserve across the plains of Africa encounters virtual wild animals (lions, elephants, etc.) in that virtual environment, while a passenger on a sightseeing adventure to polar ice caps encounters virtual arctic birds (arctic terns, snowy owls, etc.) in that virtual environment.

Other Scenarios

A vast array of other scenarios are enabled within the confines of the present invention. Other experiences involve various remote, inaccessible and imaginary virtual environments. For example, one such experience includes an adventure to outer space with stops at actual airports appearing as fuel stops at a moonbase. One such stop includes a surprise attack on the moonbase with explosions, sounds and vibrations accompanied by pilot instructions indicating the need for a quick takeoff, which results in passengers experiencing actual g-forces as well as haptic feedback from their seats, ultimately providing a thrilling experience. Such experiences couple the actual feeling of physical flight synchronized with the virtual environment. In other embodiments, the experience provides the illusion of splashing down into an ocean revealing an underwater world simulating real or imaginary locations such as the city of Atlantis.

In still other embodiments, experiences may serve educational and training purposes. For example, unlike flight simulators, the present invention is employed in one embodiment for flight training purposes during actual physical flight. In this context, the virtual course provides a mechanism for virtualizing the requirements of flight training certifications, including standard maneuvers (lazy eights, turns around a point, etc.) as well as compliance with VFR ("visual flight rules") and IFR ("instrument flight rules").

In one embodiment, the visual course includes virtual "boxes" or other virtual obstacles at designated altitudes and orientations to implement constraints imposed by these rules, along with accompanying text, audio, video, haptic and other feedback. The present invention not only detects successful completion of particular maneuvers and violations of required navigational paths, but also in one embodiment provides advance feedback—e.g., indicating that a pilot is at risk of failing to complete a particular maneuver or straying outside a required navigational path. As a result, pilots can train for flight tests and even complete certifications (with or without physical instructors) even more effectively than if they relied solely on flight simulators, physical instructors and "under the hood" training and testing.

In an "in-flight entertainment" scenario, passengers encounter a fully immersive mixed reality experience via VR headsets and the use of cameras mounted on the exterior of the aircraft. This enables passengers to view actual three-dimensional space in real time from the perspective of the outside of the aircraft (including actual clouds, birds and other static and dynamic real-world objects)—optionally mixed with the virtual environment created by the present invention. In one embodiment, passengers are entertained merely by the immersive view from the aircraft itself, while in other embodiments this view is mixed with an unlimited number of virtual environments, including those described and suggested above.

As is apparent from the above-described scenarios, the possible implementations of the present invention are end-less. What they share in common is the experience of actual physical flight enhanced by a virtual course, particularly when integrated within a remote, inaccessible or imaginary virtual environment. Experiences of pilots and passengers (and even spectators) are further enhanced via the integra-tion of transparencies from prior flights and various other accompanying features described and suggested herein.

The invention claimed is:

1. A navigational system that facilitates the navigation of a virtual course by a pilot of a physical aircraft flying through actual three-dimensional space, the system com-prising:

(a) a virtual course generator that enables a user of the system to design a virtual course through which the pilot navigates the physical aircraft while flying through actual three-dimensional space;

(b) a virtual environment generator that enables the user of the system to model a plurality of virtual environ-ments into which the virtual course is integrated;

(c) a VR headset worn by one or more passengers on the physical aircraft, wherein the VR headset enables the one or more passengers to select one of the plurality of virtual environments into which the virtual course is integrated, and displays the navigational path of the physical aircraft through the virtual course integrated into the selected virtual environment while the pilot navigates the physical aircraft through actual three-dimensional space; and d) a navigation manager that synchronizes the position of the physical aircraft in actual three-dimensional space to a position of the virtual course within the virtual environment while the pilot is flying through actual three-dimensional space.

2. A navigational system that facilitates the navigation of a virtual course by a pilot of a physical aircraft flying through actual three-dimensional space, the system com-prising:

(a) a virtual course generator that enables a user of the system to design a virtual course through which the pilot navigates the physical aircraft while flying through actual three-dimensional space;

(b) a virtual environment generator that enables the user of the system to model a plurality of virtual environ-ments into which the virtual course is integrated;

(c) a display device enabling the pilot to select one of the plurality of virtual environments into which the virtual course is integrated, and view the navigational path of the physical aircraft through the virtual course inte-grated into the selected virtual environment while fly-ing through actual three-dimensional space; and (d) a navigation manager that synchronizes the position of the physical aircraft in actual three-dimensional space to a position of the virtual course within the virtual environment while the pilot is flying through actual three-dimensional space.

3. A navigational system that facilitates the navigation of a virtual course by a pilot of a physical aircraft flying through actual three-dimensional space, the system com-prising:

(a) a virtual course generator that enables a user of the system to design a virtual course through which the pilot navigates the physical aircraft while flying through actual three-dimensional space;

(b) a display device enabling the pilot, while flying through actual three-dimensional space, to view the real-time navigational path of the physical aircraft as it traverses the virtual course in a competitive time trial race, while simultaneously viewing a superimposed transparency of the same or another pilot's previous traversal of the same virtual course; and (c) a navigation manager that synchronizes the position of the physical aircraft in actual three-dimensional space to a position of the virtual course while the pilot is flying through actual three-dimensional space.

4. A method of navigating a virtual course by a pilot of a physical aircraft flying through actual three-dimensional space, the method comprising the following steps:

(a) enabling a user of the system to design a virtual course through which the pilot navigates the physical aircraft while flying through actual three-dimensional space;

(b) enabling the pilot, while flying through actual three-dimensional space, to view the real-time navigational path of the physical aircraft as it traverses the virtual course in a competitive time-trial race, while simulta-neously viewing a superimposed transparency of the same or another pilot's previous traversal of the same virtual course; and (c) synchronizing the position of the physical aircraft in actual three-dimensional space to a position of the virtual course while the pilot is flying through actual three-dimensional space.

* * * * *